May 6, 1924.
J. W. GRADY
REENFORCEMENT FOR AUTOMOBILES
Filed Dec. 28, 1921
1,493,032
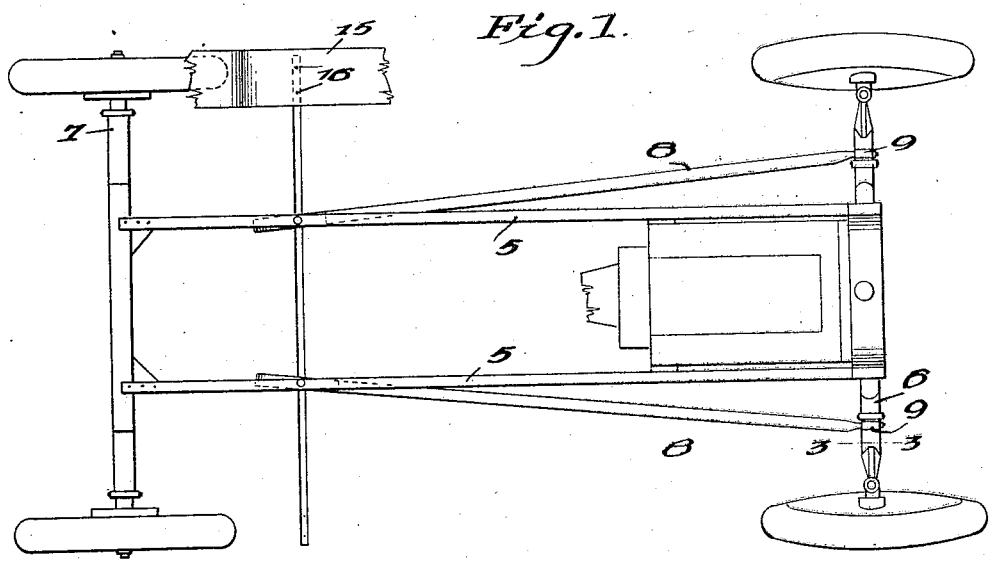
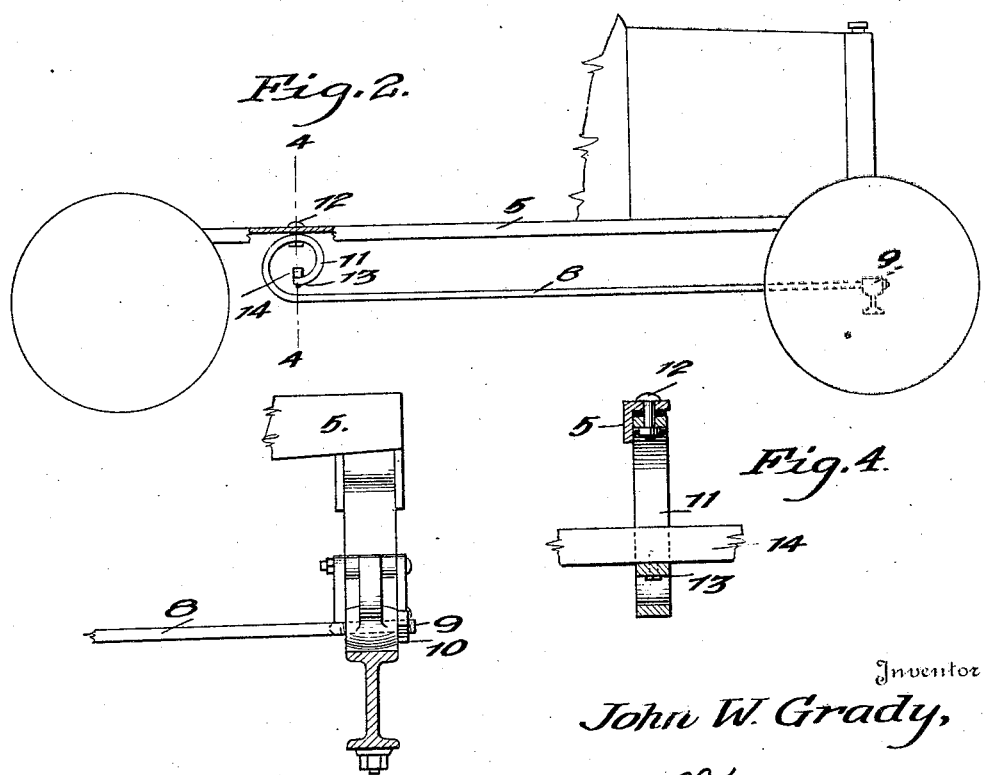
Inventor
John W. Grady,
By
Attorney Patented May 6, 1924.

1,493,032

UNITED STATES PATENT OFFICE.

JOHN W. GRADY, OF GOLDSBORO, NORTH CAROLINA.

REENFORCEMENT FOR AUTOMOBILES.

Application filed December 28, 1921. Serial No. 525,374.

*To all whom it may concern:*

Be it known that I, JOHN W. GRADY, a citizen of the United States, residing at Goldsboro, in the county of Wayne and State of North Carolina, have invented certain new and useful Improvements in Reenforcements for Automobiles, of which the following is a specification.

The present invention relates to structural reenforcements for automobiles and the object is to provide bracing means for the front axle that is simple and will permit a certain amount of yielding of the frame, while preventing excessive play.

The invention may be in the form of an attachment that may be readily applied to existing structures.

In the accompanying drawings:—

Figure 1 is a plan view of the chassis of an automobile showing the invention in place therein, Figure 2 is a side elevation partly in section, Figure 3 is a detail sectional view substantially on the line 3—3 of Figure 1, Figure 4 is a cross sectional view on the line 4—4 of Figure 2.

The frame structure of the automobile shown may be of well known form, comprising longitudinal bars 5 supported by a front axle 6 and a rear axle 7.

The reenforcement consists of longitudinal bars 8, the front ends of which are threaded to pass through eyes 9 of the front axle and have screwed thereupon holding nuts 10. The rear ends of these reenforcing bars are formed into upwardly extending involute spring portions 11, and through the uppermost parts of said spring portions are passed bolts 12 that extend through the bars 5. The terminals 13 of these involute portions have fastened to them a cross bar 14 that projects far enough to extend beneath and be fastened to the running boards of the automobile, a portion of one of which is shown at 15. These fastenings, as 16, may be rivets, bolts or the like.

It has been found that this structure holds the front axle firmly and yet allows sufficient movement under stress to relieve undue shocks. The cross bar not only serves as a holding medium between the two reenforcing bars, but acts as a supplemental support for the running boards. It will, of course, be understood that the involute portions 11, while allowing some yielding action, are relatively rigid so as to normally hold the parts with firmness.

From the foregoing, it is thought that the construction, operation and many advantages of the herein described invention, will be apparent to those skilled in the art, without further description, and it will be understood that various changes in the size, shape, proportion and minor details of construction, may be resorted to without departing from the spirit or sacrificing any of the advantages of the invention.

Having thus fully described my invention, what I claim as new, and desire to secure by Letters Patent, is:—

1. A structural reenforcement for automobiles, comprising spaced longitudinal bars having yielding rear end portions, means for securing the front ends of the bars to the front axle of the automobile, means for securing the rear end portions adjacent their extremities directly to the frame bars of an automobile, and a cross bar secured to the extremities of the yielding rear end portions and having means for securing its ends to the running boards of such automobile.

2. A structural reenforcement for automobiles, comprising spaced longitudinal bars having substantially involute spring rear ends, means for securing the front ends of the bars to the front axle of an automobile, means for securing intermediate portions of the involute rear ends to the frame of an automobile, and a cross bar secured to the free terminals of the involute ends and having means for attaching the ends thereof to the opposite running boards.

3. A structural reenforcement for automobiles, comprising spaced longitudinal bars provided at the front ends with means for attachment to the front axle of an automobile and having upstanding substantially involute spring rear ends, the highest portions of said springs having means whereby they may be attached to the frame of an automobile, and a cross bar secured to the ends of the springs and located transversely within the same, said cross bar having terminal means for attaching it to the opposite running boards.

4. The combination with an automobile frame including a front axle and spaced longitudinal bars, of spaced reinforcing bars secured at their front ends to the front axle and terminating at their rear ends in upstanding involute springs, connections between the uppermost intermediate portions of the springs, and the frame bars, a cross bar extending transversely through the springs and secured to their inner ends, and running boards resting on the ends of the cross bar.

In testimony whereof, I affix my signature in the presence of two witnesses.

JOHN W. GRADY.

Witnesses:
W. S. GRADY,
SIE F. POWELL.